July 31, 1945.  R. H. SCHILLING ET AL  2,380,874
ROOT STARCH PROCESS
Filed April 20, 1942
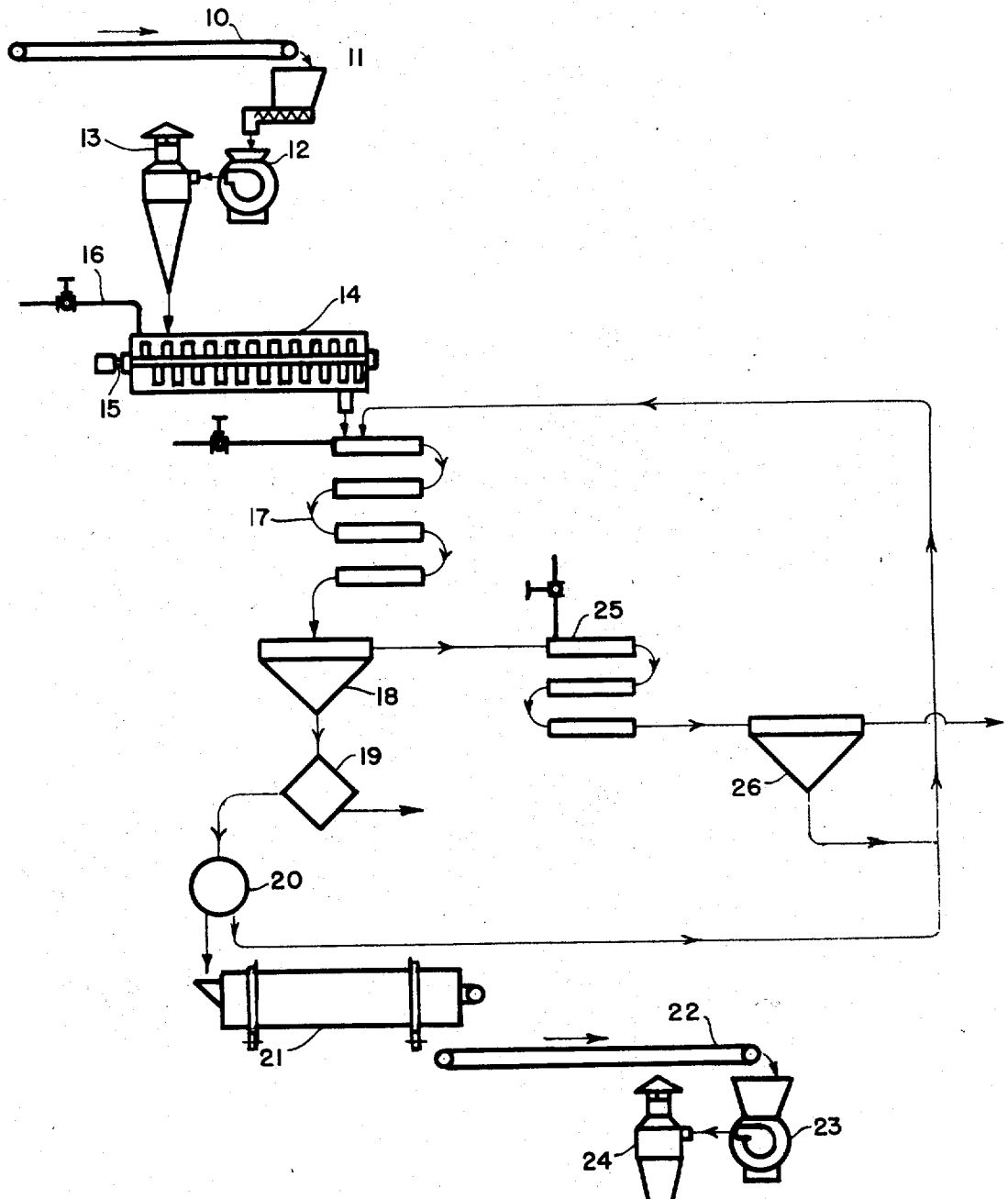
INVENTORS
RICHARD H. SCHILLING
GEORGE J. MITCHELL
BY Anthony A. Juettner  ATTY.

Patented July 31, 1945

2,380,874

UNITED STATES PATENT OFFICE 2,380,874

ROOT STARCH PROCESS

Richard H. Schilling and George J. Mitchell, Minneapolis, Minn., assignors to General Mills, Inc., a corporation of Delaware Application April 20, 1942, Serial No. 439,664

5 Claims. (Cl. 127—66)

The present invention relates to a process of separating starch from roots. More particularly, it relates to a process of separating starch from roots which makes possible much greater recovery of the starch and at the same time makes possible the preparation of a pure product.

While the process is described hereinafter in detail with respect to mandioca, it will be apparent that other root starches may be treated according to the present invention without departing from the spirit thereof.

At present starch is prepared from mandioca roots by wet grinding of the fresh roots. It has been important that the roots be processed on the same day that they are removed from the ground for otherwise the enzymes apparently convert the starch into an unsatisfactory form. In a modification of this process the roots are broken up into relatively large pieces which may then be dried. Subsequently these dried pieces are soaked in water for a considerable period of time and are then wet ground and the starch removed from them. These processes have not been wholly satisfactory as yields have been small, in many instances considerably less than 50 per cent, and the product has been very impure. The present applicants have found that mandioca roots may be dried for storage purposes after which they may be processed according to the present invention to produce an improved product and to provide a materially increased yield. Preferably the roots are sliced into small pieces which are then washed and dried, as in the manner referred to above. These dried pieces are conventionally referred to as raspas. In this way it is possible to prepare a material which can be stored for considerable priods of time and may be shipped to a central processing plant. Thus as the materials are collected they may be processed in large plants making possible more accurate control of the process and more efficient manipulation. The dried roots or raspas may then be dry ground in any suitable type of mill, for example a hammer mill, after which they are mixed with water, and the starch is removed by washing. It has been found that this procedure makes possible a substantially increased yield of a very pure product.

The following specific description of the invention in connection with the diagrammatic illustration in the drawing is for the purpose of illustration only and is not to be construed as limiting the invention thereto.

The raspas from storage are advanced along conveyor 10 which discharges into hopper 11 provided with a suitable screw discharge means at the bottom thereof. From this feeding means the raspas are fed into the mill 12 which preferably is a hammer mill and are discharged therefrom by means of a blower. The ground material is separated in cyclone separator 13 and is discharged into the mixing device 14. This mixing device is provided with an agitator 15 which may be of any form suitable for mixing a dry ground material with water, although we prefer a form that will progressively advance the material from the inlet end to the discharge end, thus making possible a continuous operation. Water is introduced from source 16. It appears that the working of the comminuted material and water in the form of a dough tends to separate the starch particles from the fibers so that a better separation may be effected in the extracting steps. The ground material and the water, in the form of a dough, are discharged from the mixer 14 into a series of extractors 17 into which a considerable quantity of additional water is introduced. These extractors are provided with agitating means which serve to make a slurry out of the mixture of dough and water. The agitators in these extractors are likewise preferably of the type which advance the material continuously therethrough. The material discharged from the end of the extractors is in the form of a slurry which is then passen over screen 18 for the purpose of removing. For the purpose of illustration we have found that a 12XX silk screen is suitable for this purpose. The slurry passing through the screen is introduced into a centrifuge 19. This centrigue is preferably of the continuous type into which material to be separated can be continuously fed and the two separated materials may be continuously discharged. An example of such a centrifuge will be found in United States Patent No. 1,923,455. The heavy effluent is in the form of a concentrated slurry which may be run through a suitable filter 20 which may be continuous. The filtered starch discharged from filter 20 is then run through a suitable drier 21 and discharged from the opposite end thereof. The dried starch may then be advanced on conveyor 22 and discharged into mill 23 where it is reduced to a suitable size. The ground starch is separated in cyclone separator 24 from which it may be run to storage or otherwise suitably disposed of. The light effluent from centrifuge 19 which contains most of the pulp and fiber and a small amount of starch may be suitably disposed to waste or may be recovered for feed purposes. The overs on screen 18 are run to an additional set of extractors 28 into which water may be introduced from any available source. In this extraction additional starch is extracted and may be separated from the large particles on screen 26. The overs on screen 26 may be sent to waste. The starch passing through screen 26 may be returned to the extractor 17 together with the filtrate from filter 20, to be used in a subsequent extraction. It will be apparent that as the concentration of impurities in the recycled material increases, it may be necessary to discard part and recycle only the remainder.

It is preferred to maintain the starch slurry at a pH between 5 and 7 as it is found that at this value separation is facilitated and yields and purity are improved. The quantity of water employed in the process is relatively unimportant but a slurry containing between 5 and 10 per cent solids at the point of introduction to the centrifuge has proven highly satisfactory.

It will be apparent from the above description that the present invention makes possible a rapid and efficient production of starch from roots. The amount of equipment required is small in comparison with the process heretofore used. Furthermore, the time period required for processing has been reduced to a small fraction of that necessary in conventional processes.

While the invention has been described in detail, it is to be understood that various modifications thereof may be made without departing from the scope of the claims appended hereto.

We claim as our invention:

1. Process of recovering starch from roots which comprises, comminuting dried roots, mixing the comminuted roots with water to form a dough, working the dough to loosen starch from the fibrous material, mixing the dough with water to form a thin starch slurry, concentrating said slurry by centrifugal means, filtering said slurry and drying the resultant starch.

2. Process of recovering starch from mandioca, which comprises comminuting raspas in a dry condition, mixing the comminuted raspas with water to form a dough, working the dough to loosen starch from the fibrous material, mixing the dough with water to form a starch slurry, concentrating said slurry by centrifugal means, filtering the concentrated slurry and drying the resultant starch.

3. Process of recovering starch from mandioca which comprises, comminuting raspas in a dry condition, mixing the comminuted raspas with water to form a dough, mixing the dough with water to form a slurry, separating relatively large particles from the slurry, concentrating the slurry by centrifugal means, filtering the concentrated slurry, drying the resultant starch, mixing water with the large particles separated from the slurry, separating large particles from the resultant mixture and returning the water and fines for mixing with the dough.

4. Process of recovering starch from roots which comprises comminuting dried roots, mixing the comminuted roots with water to form a dough, working the dough to loosen starch from the fibrous material, mixing the dough with water to convert it to a slurry, recovering starch from said slurry, and returning an impure starch slurry to the step of mixing the dough with water to convert it to a slurry for the recovery of additional starch.

5. Process of recovering starch from roots which comprises comminuting dried roots, mixing the comminuted roots with water to form a dough, working the dough to loosen starch from the fibrous material, mixing the dough with water to form a starch slurry, and recovering the starch from the slurry.

RICHARD H. SCHILLING.
GEORGE J. MITCHELL.

CERTIFICATE OF CORRECTION.

Patent No. 2,380,874.

July 31, 1945.

RICHARD H. SCHILLING, ET AL.

It is hereby certified that error appears in the printed specification of the above numbered patent requiring correction as follows: Page 1, second column, line 30, for "passen over screen 18 for the purpose of remov-" read --passed over screen 18 for the purpose of removing any large particles not suitably reduced.--; and that the said Letters Patent should be read with this correction therein that the same may conform to the record of the case in the Patent Office.

Signed and sealed this 20th day of November, A. D. 1945.

(Seal)

Leslie Frazer
First Assistant Commissioner of Patents.

25 into which water may be introduced from any available source. In this extraction additional starch is extracted and may be separated from the large particles on screen 26. The overs on screen 26 may be sent to waste. The starch passing through screen 26 may be returned to the extractor 17 together with the filtrate from filter 28, to be used in a subsequent extraction. It will be apparent that as the concentration of impurities in the recycled material increases, it may be necessary to discard part and recycle only the remainder.

It is preferred to maintain the starch slurry at a pH between 5 and 7 as it is found that at this value separation is facilitated and yields and purity are improved. The quantity of water employed in the process is relatively unimportant but a slurry containing between 5 and 10 per cent solids at the point of introduction to the centrifuge has proven highly satisfactory.

It will be apparent from the above description that the present invention makes possible a rapid and efficient production of starch from roots. The amount of equipment required is small in comparison with the process heretofore used. Furthermore, the time period required for processing has been reduced to a small fraction of that necessary in conventional processes.

While the invention has been described in detail, it is to be understood that various modifications thereof may be made without departing from the scope of the claims appended hereto.

We claim as our invention:

1. Process of recovering starch from roots which comprises, comminuting dried roots, mixing the comminuted roots with water to form a dough, working the dough to loosen starch from the fibrous material, mixing the dough with water to form a thin starch slurry, concentrating said slurry by centrifugal means, filtering said slurry and drying the resultant starch.

2. Process of recovering starch from mandioca, which comprises comminuting raspas in a dry condition, mixing the comminuted raspas with water to form a dough, working the dough to loosen starch from the fibrous material, mixing the dough with water to form a starch slurry, concentrating said slurry by centrifugal means, filtering the concentrated slurry and drying the resultant starch.

3. Process of recovering starch from mandioca which comprises, comminuting raspas in a dry condition, mixing the comminuted raspas with water to form a dough, mixing the dough with water to form a slurry, separating relatively large particles from the slurry, concentrating the slurry by centrifugal means, filtering the concentrated slurry, drying the resultant starch, mixing water with the large particles separated from the slurry, separating large particles from the resultant mixture and returning the water and fines for mixing with the dough.

4. Process of recovering starch from roots which comprises comminuting dried roots, mixing the comminuted roots with water to form a dough, working the dough to loosen starch from the fibrous material, mixing the dough with water to convert it to a slurry, recovering starch from said slurry, and returning an impure starch slurry to the step of mixing the dough with water to convert it to a slurry for the recovery of additional starch.

5. Process of recovering starch from roots which comprises comminuting dried roots, mixing the comminuted roots with water to form a dough, working the dough to loosen starch from the fibrous material, mixing the dough with water to form a starch slurry, and recovering the starch from the slurry.

RICHARD H. SCHILLING.
GEORGE J. MITCHELL.

CERTIFICATE OF CORRECTION.

Patent No. 2,380,874.  July 31, 1945.

RICHARD H. SCHILLING, ET AL.

It is hereby certified that error appears in the printed specification of the above numbered patent requiring correction as follows: Page 1, second column, line 30, for "passen over screen 18 for the purpose of remov-" read --passed over screen 18 for the purpose of removing any large particles not suitably reduced.--; and that the said Letters Patent should be read with this correction therein that the same may conform to the record of the case in the Patent Office.

Signed and sealed this 20th day of November, A. D. 1945.

(Seal)

Leslie Frazer
First Assistant Commissioner of Patents.